(12) United States Patent
Friese et al.

(10) Patent No.: US 12,183,129 B2
(45) Date of Patent: Dec. 31, 2024

(54) METHOD AND DEVICE FOR GENERATING A WEAR PARAMETER AT A TWO-WHEELER, AND A TWO-WHEELER THUS EQUIPPED

(71) Applicant: Robert Bosch GmbH, Stuttgart (DE)

(72) Inventors: Andreas Friese, Pfalzgrafenweiler (DE); Christof Kaerner, Albershausen (DE); Daniel Poganatz, Renningen (DE); Philipp Kohlrausch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 577 days.

(21) Appl. No.: 17/449,544

(22) Filed: Sep. 30, 2021

(65) Prior Publication Data
US 2022/0108567 A1  Apr. 7, 2022

(30) Foreign Application Priority Data
Oct. 7, 2020  (DE) .......................... 102020212667.4

(51) Int. Cl.
*G07C 5/04* (2006.01)
*B62J 45/411* (2020.01)
(Continued)

(52) U.S. Cl.
CPC .............. *G07C 5/04* (2013.01); *B62J 45/411* (2020.02); *B62J 45/412* (2020.02); *B62J 45/414* (2020.02);
(Continued)

(58) Field of Classification Search
CPC .......... G07C 5/04; G07C 5/008; B62J 45/411; B62J 45/412; B62J 45/414; B62J 45/41; B62M 6/40; B62M 6/50; B62L 3/00
See application file for complete search history.

(56) References Cited

U.S. PATENT DOCUMENTS

2009/0181826 A1  7/2009  Turner
2014/0229054 A1* 8/2014  Gerundt ................... B62J 50/22
                                                                      701/29.4
(Continued)

FOREIGN PATENT DOCUMENTS

DE         10029238 A1    12/2001
DE     102012222854 A1     6/2014
(Continued)

*Primary Examiner* — Ian Jen
*Assistant Examiner* — Renee LaRose
(74) *Attorney, Agent, or Firm* — NORTON ROSE FULBRIGHT US LLP; Gerard A. Messina

(57) ABSTRACT

A method, a device, and a two-wheeler including a device of this type, in which at least one wear parameter that represents the wear of at least one wear part or a component of the two-wheeler is generated, determined, or ascertained. It may be provided that a shared wear parameter for multiple wear parts or in each case separate wear parameters for individual wear parts is/are generated, determined, or formed. Typical components on a two-wheeler, in particular on a bicycle, that may be subject to wear include the brake pads, the brake disks, a sprocket, a chainring, a chain, or a tire. In addition, brake fluid in a hydraulic brake may also be subject to wear, it being possible for the brake fluid to absorb either air, water, or dirt, thus impairing the responsiveness of the pressure transfer.

15 Claims, 2 Drawing Sheets

(51) Int. Cl.
  *B62J 45/412*   (2020.01)
  *B62J 45/414*   (2020.01)
  *B62L 3/00*    (2006.01)
  *B62M 6/40*    (2010.01)
  *G07C 5/00*    (2006.01)

(52) U.S. Cl.
  CPC ............... *B62M 6/40* (2013.01); *G07C 5/008* (2013.01); *B62L 3/00* (2013.01)

(56) References Cited

U.S. PATENT DOCUMENTS

2019/0084548 A1* 3/2019 Ohazulike ............... F16D 66/00
2021/0046911 A1* 2/2021 Levi ....................... B60T 17/22

FOREIGN PATENT DOCUMENTS

| | | |
|---|---|---|
| EP | 2468616 A1 | 6/2012 |
| EP | 2718065 A1 | 4/2014 |
| EP | 3392128 A1 | 10/2018 |
| WO | 2012167987 A1 | 12/2012 |

* cited by examiner

METHOD AND DEVICE FOR GENERATING A WEAR PARAMETER AT A TWO-WHEELER, AND A TWO-WHEELER THUS EQUIPPED

CROSS REFERENCE

The present application claims the benefit under 35 U.S.C. § 119 of German Patent Application No. DE 102020212667.4 filed on Oct. 7, 2020, which is expressly incorporated herein by reference in its entirety.

FIELD

The present invention relates to a method and a device for generating a wear parameter at a wear part of a two-wheeler, and a two-wheeler that includes a device of this type.

BACKGROUND INFORMATION

A method for monitoring the intensity of at least one friction partner of a vehicle brake is described in German Patent Application No. DE 100 29 238 A1. In this regard, a wear model is created which takes into account, among other things, the operating time, the brake operating pressure, and the temperature prevailing in the area of the friction partners.

A method for recognizing wear of at least one chain drive of an electric bicycle is described in European Patent No. EP 2 718 065 B1, in which the operating state of the chain is monitored using at least one sensor. The load on the chain over the operating period is detected, and the need for maintenance is displayed as soon as a continuous load threshold defined for the chain is reached.

An object of the present invention is to provide a recognition of wear for at least one wear component of a two-wheeler which is updated based on dynamically detected operating and/or status data of the two-wheeler.

SUMMARY

In accordance with example embodiment of the present invention a method, a device, and a two-wheeler that includes this type of device are provided, in which at least one wear parameter that represents the wear of at least one wear part or of a (wear) component of the two-wheeler is generated, determined, or ascertained. For example, it may be provided that a shared wear parameter for multiple wear parts or in each case separate wear parameters for individual wear parts is/are generated, determined, or formed. Examples of typical components on a two-wheeler, in particular on a bicycle, that may be subject to wear include the brake pads, the brake disks, a sprocket, a chainring, a chain, or a tire. In addition, brake fluid in a hydraulic brake may also be subject to wear, it being possible for the brake fluid to absorb either air, water, or dirt, thus impairing the responsiveness of the pressure transfer.

In accordance with an example embodiment of the present invention, for generating, determining, ascertaining, or deriving the wear parameter, at least one weight parameter and a use parameter of the two-wheeler are detected. The wear parameter for at least one wear part is derived at least from the weight parameter and the use parameter.

The actual load on the wear part may be detected by taking into account the dynamic parameters that are collected at the two-wheeler. By interpreting the wear parameter as a measure for repair or replacement, based on the wear parameter the need for visiting a service facility may be displayed to the rider of the two-wheeler. Optionally, it may also be provided that the method automatically schedules a visit to a service shop, for example via a (radio) wireless link or via a connection to the Internet, when a predefined value is reached.

In a further embodiment of the present invention, it may be additionally provided that at least one further parameter is detected that detects the intensity of the use of the two-wheeler. This intensity parameter thus detected may additionally be used for generating, determining, ascertaining, or deriving the wear parameter.

The intensity parameter describes how intensively the two-wheeler and in particular its components are used. Thus, by use of the intensity parameter a distinction may be made between a light load and a heavy load on the components. As the basis for generating, determining, ascertaining, or deriving the intensity parameter, an operating parameter that characterizes the operation of the two-wheeler, in particular an (electric) bicycle may be detected. The temporal profile of the speed and/or acceleration at which the bicycle travels may be detected as an operating parameter with the aid of a sensor appropriately mounted on the two-wheeler. A further operating parameter may be the pedaling torque applied to the pedal axle by the rider. In addition, the drive torque generated by the drive unit or its drive power may also be used to derive the intensity. For generating, deriving, forming, or determining the intensity parameter, one of the detected operating parameters may be processed, or a weighted processing of multiple operating parameters may be provided. An average value, a variance, a summation, and/or a weighting of individual or multiple operating parameters may be used. In determining the intensity parameter, it is particularly advantageous to take into account operating parameters that are detected or determined since a predefined point in time or in a predefined time period. For example, the replacement of a (wear) component at the two-wheeler may be taken into account, for example for the repair and replacement of a new, unworn component.

As mentioned above, the method as well as the device may compare the detected wear parameter to a first threshold value. If the first threshold value is reached or the wear parameter even exceeds this first threshold value, this may be an indication for the need to replace the associated wear part or the (wear) component, since further use may mean impairment of the use of the two-wheeler and endangerment or injury to the rider. The first threshold value may be selected in such a way that sufficient use of the two-wheeler and in particular of the wear part is still possible without prompting an immediate replacement. It may even be provided that at least two first threshold values for the wear part are provided, and when a lower first threshold value is reached or exceeded, the rider is notified that a replacement would be meaningful or advisable, while the reaching or exceeding of an upper first threshold value more emphatically reinforces the requirement for replacement or for repair. It may even be provided that components of the two-wheeler are controlled as a function of the exceedance of the lower or upper first threshold value in order to prevent further wear or endangerment of the rider.

As a weight parameter, different weights may be detected which in each case have effects on the use and in particular the use intensity of the two-wheeler or of the wear parts. Thus, with the aid of suitable sensors or via the input of appropriate information, the weight of the two-wheeler, of the rider, of the additional load (on the cargo rack, for example), and/or of a trailer (for example, in the form of the weight force on a trailer hitch at the two-wheeler) may be detected for deriving the wear parameter.

For detecting the use parameter, it may be provided to detect the kilometers traveled by the two-wheeler, its use time, the number of braking operations, and the intensity of the braking operations as representative parameters. The intensity of the braking operations may be detected with the aid of the application pressure of the brake linings and/or by detecting the brake pressure of the hydraulic pressure in a corresponding brake line. It may likewise be provided that the use parameter for determining the wear parameter is detected based on the parameters detected since a predefined point in time or in a predefined time period.

The generation, determination, ascertainment, or derivation of the wear parameter advantageously takes place by inputting the at least one weight parameter, the at least one use parameter, and in particular the at least one intensity parameter with different weightings.

The method and the device may particularly advantageously be used to protect the components of the two-wheeler, in particular the wear parts, as well as the rider when the wear of a component may become problematic for the operation or the use. In this case, a comparison of the wear parameter to a second threshold may take place. If this second threshold value is reached or exceeded by the wear parameter, an additional component may be controlled which either at least reduces the increase in wear of the monitored wear part or compensates for the use of the wear part. It would be possible here for a sprocket to be automatically skipped over during the automatic activation of a gear shift when wear or damage of this sprocket of the chainring is recognized. The second threshold value may be larger or smaller than the first threshold value, and in particular may correspond to the upper first threshold value.

In a further embodiment of the present invention, it is provided that at least two wear parts are to be monitored. For this purpose, it is provided that a dedicated wear parameter, and in particular dedicated first and second threshold values, is/are associated with each wear part.

Further advantages result from the following description of exemplary embodiments and from the figures.

DETAILED DESCRIPTION OF EXAMPLE EMBODIMENTS

Figure 1:
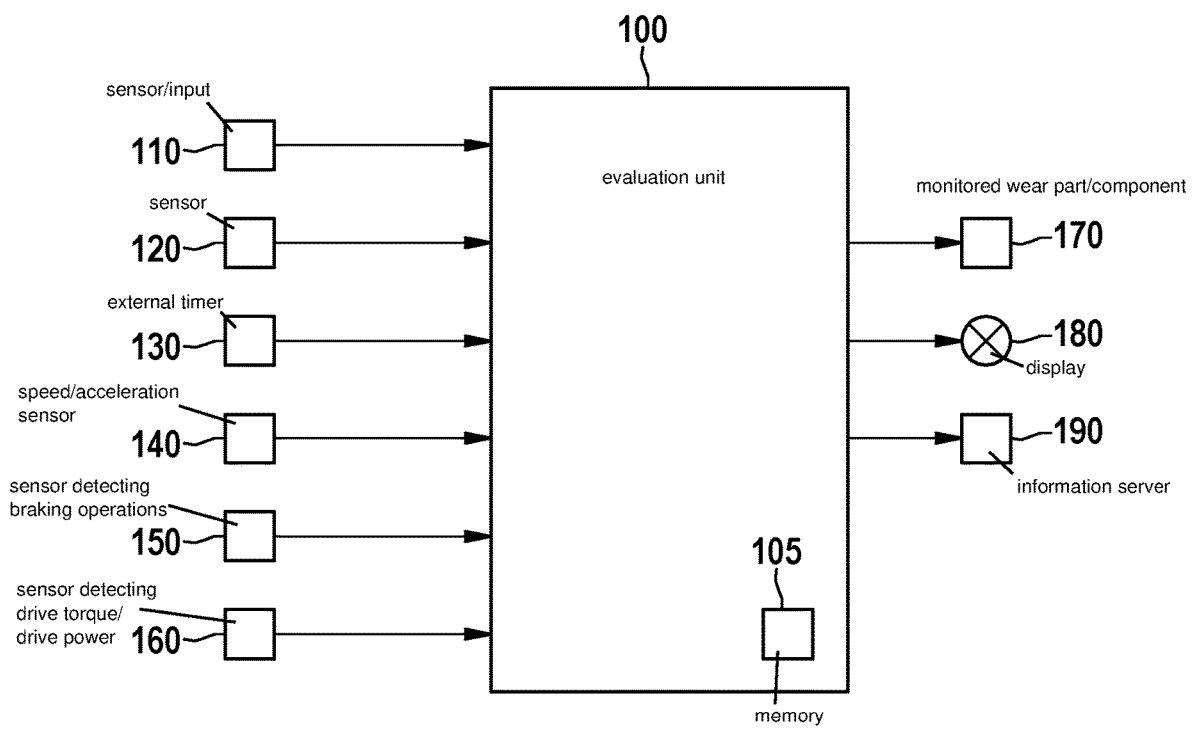
FIG. 1 schematically illustrates an example evaluation unit that carries out a method according to the present invention.

One example embodiment of a device according to the present invention for generating a wear parameter is described with reference to the block diagram in FIG. 1. The device includes an evaluation unit 100 that detects or reads in the sensor parameters or input information for carrying out the method according to the present invention. The device as well as the method is described below based on a bicycle, and in particular based on an electric bicycle, it being clarified that the present invention may be applied to any type of two-wheeler.

Evaluation unit 100 detects via an appropriate input at least one weight parameter that represents the weight of the bicycle, of the rider of the two-wheeler, of the load (on the cargo rack or at the front wheel, for example), and/or of the trailer. The weight in question or its weight parameter may be provided with the aid of a sensor 110 or an input, for example by manually inputting the weight of the bicycle or of the rider. The weight of the trailer may be detected via sensors in the wheels of the trailer or via a sensor at the trailer hitch. It is also possible for at least one of the weight parameters to not be directly detected using a weight sensor or force sensor, but, rather, to be derived from other parameters. Thus, for example, the total weight may be derived from the behavior during acceleration or deceleration of the bicycle. Evaluation unit 100 detects or generates a use parameter as a further parameter that influences the wear. For forming the use parameter and also for the intensity parameter, to be described in greater detail below, the detection in the broader sense is to also encompass the process of determination, derivation, production, or generation. The kilometers traveled, the general temporal use of the bicycle, and/or the number and/or intensity of the braking operations may be detected or used as a use parameter. For generating the use parameter, an appropriate sensor 120 may be used which detects the kilometers traveled. However, an (additional) sensor may also be provided which detects the number and the intensity of the braking operations, for example by detecting the decelerations or the brake pressure in the brake line. Furthermore, evaluation unit 100 may also detect the actual use of the bicycle, using an accompanying timer, for example. However, it may also be provided that the use time is detected or read in via an external timer 130. In addition, the traveled speed and/or the acceleration of the bicycle as a corresponding sensor parameter may be detected and read in via a speed sensor and/or acceleration sensor 140. In particular, it may be provided that the temporal profile of the speed parameter and/or of the acceleration parameter is evaluated in evaluation unit 100. In addition, the braking operations may be detected using a suitable sensor 150 and read in for the evaluation. This may be, for example, a sensor that detects the intensity of the braking operation by detecting the application force or the application pressure on the brake linings at the wheel rim or the brake disk. Alternatively or additionally, the pressure in the line of a hydraulic braking system or the actuation of the brake lever by the rider may be detected. In the detection of the braking operation and in particular its intensity, the temporal profile may also be detected in evaluation unit 100 in order to take into account the intensity of the stress on the braking system and on the bicycle. Optionally, it may also be provided that the intensity of the actuation of the pedal crank or pedal axle by the rider or by a drive of the bicycle is detected with the aid of at least one suitable sensor 160. For example, the pedaling force on the pedal crank or the pedaling torque on the pedal axle may be detected. However, since the drive torque generated by the drive of the bicycle, for example for an electric bicycle, also has effects on the wear of certain parts or components, the drive torque and/or the drive power generated by the drive may likewise be detected with the aid of a sensor 160 and taken into account in the evaluation. Another option is to also take into account the uphill and downhill travel of the bicycle. An inclination sensor or gradient sensor, for example, may be used. However, the uphill and downhill travel may also be derived with the aid of a barometric altimeter or from the derivative of the acceleration in the direction of the vertical axis.

The sensor parameters in question as well as the use parameter and/or the intensity parameter may be integrally collected in each case in order to obtain the entire use for the evaluation. For a replacement of a component of the bicycle, in particular the wear part or wear component, it may be provided that the use parameter and/or the intensity parameter are/is set, at least in part, to zero so that the use and the intensity for the new wear part are recomputed or redetermined.

In particular, a memory 105 which in addition to the detected sensor parameters may also contain predefined values is provided in evaluation unit 100. Threshold values for the evaluation as well as individual parameters may be stored and used for generating or determining the at least one wear parameter. It is possible, for example, for the weight of the bicycle to be input only once and stored in memory 105. In addition, memory 105 may also contain control routines for components of the bicycle, which are triggered when threshold values are reached.

If it is recognized during the determination or generation of the at least one wear parameter that at least one wear part is sufficiently worn, it may be provided that evaluation unit 100 informs the rider of the wear via an appropriate display element 180. By selecting an associated threshold value in such a way that, despite the exceedance of this threshold value by the wear parameter, an at least sufficient time of use is still possible, the rider may be informed at the right time that the wear part must be replaced, without resulting in significant endangerment of the use of the bicycle. The rider may also be informed acoustically, or indirectly by relaying, for example wirelessly, the exceedance of the threshold value to an information server 190. As the result of a central location detecting the wear parameter or its exceedance of a threshold value, a prediction concerning the remaining life as well as information about repair options in the vicinity, based on the collected data from multiple users, may be communicated by the central location to the rider. Such communications to the rider of the bicycle may be sent, likewise wirelessly, to the rider's smart phone or a display element on the bicycle.

In a further optional embodiment, evaluation unit 100, also as a function of the value of the wear parameter, for example as a function of the exceedance of a further threshold value, may control monitored wear part 170 or the wear component in order to minimize its wear. Thus, for example, it is possible that when wear of a sprocket or chainring is recognized, the (automatic) gear shifter no longer actuates this gearwheel or avoids doing so to the greatest extent possible. Also, when wear of a portion of the drive is detected, the drive may be controlled in such a way that the wear is reduced or compensated for.

Figure 2:
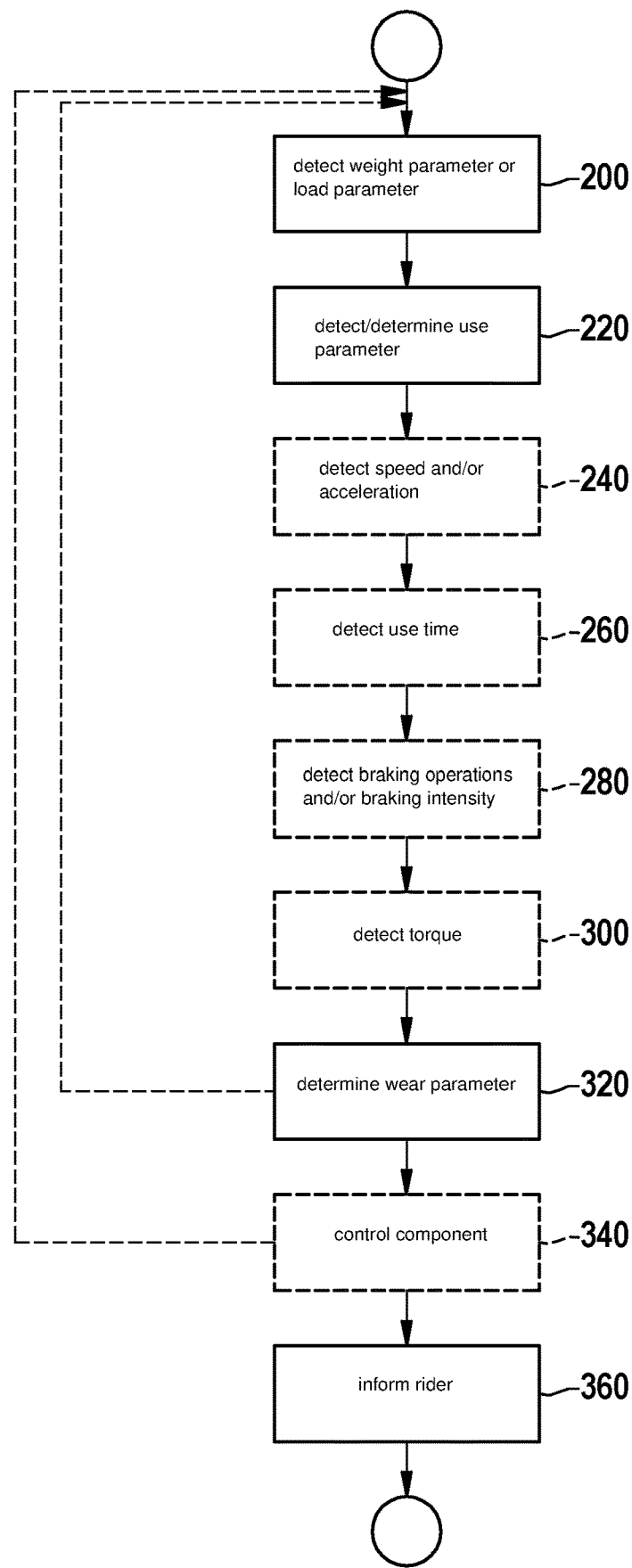
FIG. 2 shows a flowchart of a method in accordance with an example embodiment of the present invention.

A first embodiment of the method according to the present invention, which may also be carried out in evaluation unit 100, for example, is described below with reference to the flowchart in FIG. 2.

A weight parameter or load parameter that represents the weight of the bicycle (or two-wheeler in general), of the rider of the bicycle, of a load, and/or of a trailer is detected by the method in a first step 200. This parameter may be an individual parameter that represents only one of the weight parameters, or also a shared weight parameter for multiple loads, for example in the form of a total weight. In addition, it is possible for multiple individual weight parameters to be detected, collected, or determined. As previously stated, it may be provided that individual weight parameters or the total weight may be manually input or derived from other detected sensor parameters. A use parameter is detected or determined or derived in next step 220. For this purpose, for example the kilometers traveled, the temporal use of the two-wheeler, and the number and/or intensity of the braking operations are/is detected. At least one wear parameter is subsequently generated, formed, or derived in step 320 as a function of the at least one weight parameter or load parameter that is detected in step 200, and of the at least one use parameter that is detected in step 220. This at least one wear parameter may represent a measure for general wear of the bicycle, or may concern a certain wear part or a component of the bicycle. Thus, for example, when generating a general wear parameter, different threshold values may be used for recognizing the wear and for informing the rider, depending on the wear part or component to be monitored. However, a more accurate determination of the wear of the individual wear parts may be achieved by using individualized wear parameters. Thus, when generating a wear parameter for the chain, the stress that is relevant for the chain may be taken into account in a targeted manner. Thus, it is possible for different weight parameters or use parameters to be taken into account for each wear parameter. Optionally, it is also possible for the individual detected weight parameters or use parameters to be weighted differently for each wear part. The wear parameter may also be formed as a product, as a sum, or in the form of a (weighted) mixture of the sum and the product of the weight parameter and the use parameter. One possible generation may take place, for example, with the aid of the formula $$\text{wear parameter}(t) = k1 \times (a^* \text{weight parameter})^{k2} \times (b^* \text{use parameter}(t))^{k3} \quad (1)$$

in which a and b represent weighting factors, and k1, k2, and k3 represent physical relationships between the parameters, which may be obtained with the aid of analytical methods and/or road tests. Essentially the properties of the wear parts, the properties of the bicycle, and the typical riding behavior and the travel surroundings play a role. Optionally, a check may already be made in step 320 as to whether the wear parameter exceeds a first threshold value $SW_1$, which would entail informing the rider in step 360. If this is not the case, i.e., the generated wear parameter is below first threshold value $SW_1$, it may thus be provided to update the wear parameter by detecting further parameters in steps 200 and 220. Based on the at least one wear parameter generated, sufficient abrasion or wear of the at least one monitored wear part may be recognized in next step 360. For this purpose, at least one first threshold value $SW_1$ is used, to which the wear parameter is compared. This first threshold value $SW_1$ represents a first wear limit above which the wear part is at risk and can no longer be properly used. It is of course possible to provide multiple first threshold values $SW_{1,i}$ that represent different levels of abrasion. Thus, first threshold value $SW_{1,1}$ may also represent an indication that the wear is already recognized, but is not associated with any limitation of the use. A further first threshold value $SW_{1,2}$ could then characterize the state in which a (small) limitation of the use is to be expected.

If the wear parameter reaches or exceeds this first threshold value $SW_1$, this is interpreted as an indication that the wear part has reached sufficient wear that the wear part should be replaced, or at least that further wear should be reduced. As a function of the reaching or exceeding of first threshold value $SW_1$, the rider may thus be informed of the wear in step 360, for example via an appropriate display on a display/control unit or via the rider's smart phone. Optionally, it may also be provided that in this case an input takes place in memory 105, so that during a service visit the technician may read out the information in order to identify whether the wear part needs to be replaced. In this case, it would be helpful for first threshold value $SW_1$ to be selected in such a way that, even after threshold value $SW_1$ is reached, the bicycle and in particular the wear part may still be used for a sufficient period of time without resulting in hazardous or safety-critical situations. In addition, it may be provided that the reaching or exceeding of threshold value $SW_1$ generates an emission of this information to a data server with the aid of a wireless link. Thus, a central data server with access to a large amount of such wear information may indicate to the rider possible abrasion or imminent wear, even before the wear limit (a first threshold value $SW_1$, for example) is reached. In addition, it is possible that the central data server may use the wear information in order to send the user additional information, for example concerning the next time period in which a service facility or a repair shop is to be approached during travel. It may also be provided that the central data server already makes a possible appointment with the service facility or the repair shop and sends this information to the rider. The rider then need only confirm the appointment. For example, also based on already detected data, a preferred service facility or repair shop may be preset or specified in advance. Alternatively, a search may also be made for a service facility or repair shop in the vicinity.

In a further exemplary embodiment, the intensity with which the bicycle is used may also be taken into account when deriving the wear parameter. For this purpose, the method, starting with steps 200, 200, 330, and 360 from the preceding exemplary embodiment, may be supplemented by at least one further method step. Thus, for example, the speed and/or the acceleration of the bicycle or at least a portion thereof may be detected in a step 240. By taking into account the speed and/or the acceleration, it may thus be recognized whether the rider is using the bicycle in particular situations in which special demands are imposed on the material, for example the pedal crank or the chain. In addition, the gradient, i.e., a movement in the direction of the vertical axis, may be derived with the aid of a suitable speed sensor or acceleration sensor. However, this type of movement may also be detected by a separate inclination sensor or gradient sensor. By taking into account the gradient, it is possible, for example, to distinguish between travel on a flat surface from uphill travel, in which the rider subjects the bicycle to significantly greater load, so that greater wear may occur. In addition, the use time may be detected in a further optional step 260. This use time may also be detected, for example, as a function of further intensity parameters, use parameters, operating parameters, or weight parameters and/or taken into account for deriving the wear and forming the wear parameter. Detecting the braking operations and/or the braking intensity in a step 280 represents a further parameter that may play a role in taking the intensity into account. In addition to the number of braking operations, it is also possible to detect the intensity of the individual braking operation, for example in which the application pressure, the pressure in the hydraulic line, or the actuating force or actuating speed of the brake lever is detected. However, here as well, the braking operation may be detected in conjunction with further parameters, for example the speed or the acceleration, by deriving the effective braking effect. Thus, the greater the abrasion of the brake, the greater is the requested (negative) acceleration during the deceleration. In addition, the torque generated by the rider on the pedal axle, and thus on the chainring, is detected in a further step 300. Optionally or additionally, the drive torque generated by the drive or its drive power may be detected and taken into account in the derivation.

Based on the detected parameters in steps 200 through 300, an intensity parameter may be derived, determined, or generated which describes how intensively the bicycle and in particular the components has/have been used. For forming the intensity parameter, for example the variance of the acceleration or speed, in particular as a function of the spatial direction, an average value of the absolute value of the acceleration or of the speed, a histogram of the acceleration [or] of the speed, in particular using a weighting, an average value of the motor assist or of the torque, and/or a variance or an average value of the brake pressure may be taken into account. In particular, it may be provided that these parameters are a function of time. The wear parameter may then be derived or determined in step 320 as a supplement to the above embodiment according to formula (1), for example with the aid of a linkage according to $$\text{wear parameter}(t) = k1 \times (a^* \text{weight parameter})^{k2} \times (b^* \text{use parameter}(t))^{k3} \times (c^* \text{intensity parameter}(t))^{k4} \qquad (2)$$

As stated above, a, b, and c represent weighting factors, and k1, k2, k3, and k4 represent physical relationships between the parameters which may be obtained with the aid of analytical methods and/or road tests. However, it is possible to form the wear parameter in general as a product, as a sum, or in the form of a (weighted) mixture of the sum and the product of the weight parameter, the use parameter, and the intensity parameter.

All steps 200 through 300 may be carried out in any arbitrary order or in parallel, using different detection methods. Furthermore, it is also possible for at least two of the detected parameters to be jointly detected in steps 200 through 300 or taken into account in the derivation or determination of the wear parameter, since correlations exist between the operational parameters or the use parameters. A weighting of the individual parameters may also take place via such a joint detection or taking into account, for example in that a deceleration from a higher speed, with other parameters otherwise remaining the same, would result in a greater wear parameter. The situation is similar to taking the use into account using a higher weight, for example due to a greater additional load. In addition, the simultaneous taking into account of the vertical profile may result here in a weighted derivation of the wear parameter.

Optionally, the detection of individual or all parameters in steps 200 through 300, or taking them into account in the derivation or determination of the wear parameter, may also take place only in a certain time period or beginning at a predetermined point in time. For example, the replacement or the repair of a component of the bicycle, in particular a wear part, may be taken into account in this way. The same also applies for the establishment of the threshold values, in that the threshold values are optionally adapted to new materials of the wear part. The wear parameter or the previously detected parameters may thus be set to zero upon a replacement.

In a further exemplary embodiment, it may be provided that a component of the bicycle is controlled in a step 340, after the derivation of the wear parameter, in order to reduce further wear or prevent it entirely. It is thus possible to reduce the intensity with which the wear component is used, in that for wear of the chain or of the drive, for example, the drive power generated by the drive or its drive torque is reduced or limited. Optionally or additionally, it is also possible to control some other component which at least partially compensates for the application or the use of the monitored wear part. For the abrasion of a sprocket in the sprocket set, it is thus possible for an automatic gear shifter to be activated in such a way that this sprocket is no longer controlled, also for preventing damage to the chain. When a gear shifter is present at the pedal crank and also at the rear wheel, even an interplay of both gear shifters may compensate for the desired gear ratio. The decision as to whether a reduction of the wear or a compensation takes place may also be made based on the comparison of the wear parameter to a second threshold value $SW_2$. If this second threshold value $SW_2$ is reached or exceeded, the corresponding control or regulation takes place. It may be provided that, due to reducing or compensating for the wear, directly informing the rider is not yet necessary, for example if second threshold value $SW_2$ is lower than first threshold value $SW_1$. In this case, after the control or regulation of the components in step 340, the detection of one or multiple of parameters 200 through 300 for updating the wear parameter may begin anew.

What is claimed is:

1. A method for generating a wear parameter that represents wear of at least one wear part at a two-wheeler, the method comprising the following steps:
   detecting at least one weight force parameter; and
   detecting at least one use parameter of the two-wheeler;
   detecting at least one intensity parameter of a use of the two-wheeler; and
   determining at least one wear parameter for at least one wear part as a function of the at least one weight force parameter and the at least one use parameter and the at least one intensity parameter.

2. The method as recited in claim 1, wherein the two-wheeler is an electric bicycle.

3. The method as recited in claim 1, wherein at least one operating parameter of the two-wheeler is detected, a parameter that represents: (i) a temporal profile of a speed and/or acceleration at which the two-wheeler travels, and/or (ii) a delivered drive torque or a generated drive power of a drive unit of the two-wheeler, and/or (iii) a pedaling torque generated by a rider of the two-wheeler, is detected as an operating parameter, the at least one intensity parameter being determined as a function of at least one average value, and/or a variance, and/or a summation, and/or a weighting of at least one of multiple operating parameters, and wherein the operating parameter and/or the intensity parameter since a predefined point in time, is detected or determined.

4. The method as recited in claim 1, further comprising:
   comparing the wear parameter to a first threshold value; and
   generating a piece of wear information when the wear parameter reaches or exceeds the first threshold value.

5. The method as recited in claim 1, wherein a parameter that represents a weight of at least the two-wheeler, and/or a weight of a rider of the two-wheeler, and/or a weight of a trailer of the two-wheeler and/or a weight force at a trailer hitch of the trailer at the two-wheeler, and/or a load on the two-wheeler, is detected as a weight parameter.

6. The method as recited in claim 1, wherein at least one parameter that represents: kilometers traveled by the two-wheeler, and/or a use time of the two-wheeler, and/or a number of braking operations, and/or an intensity of the braking operations as a function of the brake pressure generated at the brake, is detected as the use parameter, the use parameter being detected since a predefined point in time.

7. The method as recited in claim 1, wherein the wear parameter is determined as a function of a weighting of the at least one weight force parameter, the at least one use parameter, and the at least one intensity parameter.

8. A device, comprising:
   an evaluation unit configured to generate a wear parameter that represents a wear of at least one wear part at a two-wheeler, the evaluation unit configured to
      detect at least one weight force parameter;
      detect at least one use parameter of the two-wheeler;
      detect at least one intensity parameter of a use of the two-wheeler; and
      determine at least one wear parameter for at least one wear part as a function of the at least one weight force parameter and the at least one use parameter and the at least one intensity parameter.

9. The device as recited in claim 8, wherein the two-wheeler is an electric bicycle.

10. The device as recited in claim 8, wherein the evaluation unit is further configured to:
    compare the wear parameter to a first threshold value; and
    generate a piece of wear information when the wear parameter reaches or exceeds the first threshold value.

11. The device as recited in claim 8, wherein the evaluation unit is further configured to:
    controls a component of the two-wheeler as a function of the wear parameter to reduce a further increase of the wear parameter, the evaluation unit being configured to control the component to reduce the further increase when a second threshold value is reached or exceeded.

12. The device as recited in claim 8, wherein the evaluation unit is further configured to:
    send a piece of information via a wireless link to a central database as a function of the wear parameter.

13. The device as recited in claim 12, wherein the piece of information is an exceedance of the wear parameter of a first threshold value.

14. A two-wheeler, comprising:
    a weight sensor configured to detect at least one weight force;
    a vehicle dynamics sensor configured to detect a use parameter and/or operating parameter of the two-wheeler; and
    an evaluation unit configured to:
       detect the at least one weight force parameter using the weight sensor,
       detect the use parameter of the two-wheeler,
       detect at least one intensity parameter of a use of the two-wheeler, and
       determine at least one wear parameter for at least one wear part as a function of the at least one weight force parameter and the use parameter and the at least one intensity parameter.

15. The two-wheeler as recited in claim 14, wherein the two-wheeler is an electric bicycle.

* * * * *